United States Patent
Rinne et al.

(10) Patent No.: US 10,474,210 B2
(45) Date of Patent: Nov. 12, 2019

(54) CONFIGURATION METHOD FOR A POWER SUPPLY CONTROLLER AND A CONTROLLER EMPLOYING SAME

(71) Applicant: Rohm Powervation Limited, Blackrock, Co. Cork (IE)

(72) Inventors: Karl Rinne, Youghal (IE); Antoin Russell, Castleconnell (IE)

(73) Assignee: Rohm Powervation Limited, Blackrock, Cork (IE)

( * ) Notice: Subject to any disclaimer, the term of this patent is extended or adjusted under 35 U.S.C. 154(b) by 0 days.

(21) Appl. No.: 16/005,543

(22) Filed: Jun. 11, 2018

(65) Prior Publication Data
US 2018/0292874 A1 Oct. 11, 2018

Related U.S. Application Data

(63) Continuation of application No. 13/878,965, filed as application No. PCT/EP2011/066365 on Sep. 20, 2011, now Pat. No. 9,996,126.

(51) Int. Cl.
*G06F 19/00* (2018.01)
*G06F 1/26* (2006.01)
*H02M 3/156* (2006.01)

(52) U.S. Cl.
CPC .............. *G06F 1/26* (2013.01); *H02M 3/156* (2013.01)

(58) Field of Classification Search
CPC .. G06F 1/26; H02M 3/156; H01L 2924/0002; H01L 2924/00; H01L 27/142; H01L 27/156; H01L 31/1085; F21Y 2115/10; F21Y 2101/00
See application file for complete search history.

(56) References Cited

U.S. PATENT DOCUMENTS

| | | | |
|---|---|---|---|
| 5,557,236 A | 9/1996 | Monti | |
| 5,678,049 A | 10/1997 | Massie | |
| 5,845,141 A | 12/1998 | Massie | |
| 5,892,354 A | 4/1999 | Nagao | |
| 6,262,594 B1 | 7/2001 | Cheung et al. | |
| 6,286,127 B1 | 9/2001 | King et al. | |
| 6,470,613 B1 | 6/2002 | Jaynes | |
| 6,936,999 B2 | 8/2005 | Chapuis | |
| 6,949,916 B2 | 9/2005 | Chapuis | |
| 7,000,125 B2 | 2/2006 | Chapuis et al. | |
| 7,049,798 B2 | 5/2006 | Chapuis et al. | |
| 7,068,021 B2 | 6/2006 | Chapuis | |
| 7,071,664 B1 | 7/2006 | Teggatz et al. | |
| 7,098,632 B2 | 8/2006 | Chen et al. | |
| 7,233,131 B2 | 6/2007 | Lin et al. | |

(Continued)

OTHER PUBLICATIONS

U.S. Appl. No. 13/878,965, filed May 6, 2013, Final Office Action, dated May 20, 2016.

(Continued)

*Primary Examiner* — Kidest Bahta
(74) *Attorney, Agent, or Firm* — Hickman Palermo Becker Bingham LLP; Edward A. Becker

(57) ABSTRACT

The present application is directed at pin programming od controllers for power converters and provides for the programming of a plurality of different controller parameters using a single programming resistor. The value of the programming resistor is used as a pointer to select a table storing a plurality of different settings for the controller.

10 Claims, 6 Drawing Sheets

(56) References Cited

U.S. PATENT DOCUMENTS

| | | | |
|---|---|---|---|
| 7,239,115 | B2 | 7/2007 | Chapuis et al. |
| 7,249,267 | B2 | 7/2007 | Chapuis |
| 7,266,709 | B2 | 9/2007 | Chapuis et al. |
| 7,315,156 | B2 | 1/2008 | Chapuis |
| 7,372,682 | B2 | 5/2008 | Chapuis |
| 7,382,676 | B2 | 6/2008 | Ballweber et al. |
| 7,394,445 | B2 | 7/2008 | Chapuis et al. |
| 7,449,872 | B2 | 11/2008 | Zolfaghari |
| 7,456,617 | B2 | 11/2008 | Chapuis et al. |
| 7,459,892 | B2 | 12/2008 | Chapuis |
| 7,554,778 | B2 | 6/2009 | Chapuis |
| 7,565,559 | B2 | 7/2009 | Chapuis |
| 7,583,487 | B2 | 9/2009 | Chapuis |
| 7,602,260 | B1 | 10/2009 | Atesoglu |
| 7,619,402 | B1 | 11/2009 | Kwong |
| 7,646,382 | B2 | 1/2010 | Chapuis et al. |
| 7,880,447 | B1 | 2/2011 | Lin |
| 8,836,352 | B2 | 9/2014 | Shearon |
| 8,988,902 | B2 | 3/2015 | Gao |
| 9,252,773 | B2 | 2/2016 | Young et al. |
| 2004/0095106 | A1* | 5/2004 | Kernahan ............... G05F 3/262 323/282 |
| 2004/0124875 | A1* | 7/2004 | Dabral ............... H03K 19/1732 326/38 |
| 2005/0223259 | A1* | 10/2005 | Lehwalder ............... G06F 1/26 713/330 |
| 2005/0258808 | A1* | 11/2005 | Chen ................... H02H 7/1213 323/222 |
| 2006/0002159 | A1 | 1/2006 | Lin et al. |
| 2006/0100812 | A1 | 5/2006 | Sturges |
| 2006/0155839 | A1 | 7/2006 | Hundscheidt |
| 2007/0069698 | A1 | 3/2007 | Laur et al. |
| 2008/0048715 | A1 | 2/2008 | Balasubramanian et al. |
| 2008/0061822 | A1 | 3/2008 | Balasubramanian et al. |
| 2008/0094101 | A1 | 4/2008 | Balasubramanian et al. |
| 2009/0128186 | A1 | 5/2009 | Balasubramanian et al. |
| 2009/0284078 | A1 | 11/2009 | Zhang |
| 2009/0284240 | A1 | 11/2009 | Zhang |
| 2010/0001760 | A1 | 1/2010 | Balasubramanian et al. |
| 2010/0188117 | A1 | 7/2010 | Street et al. |
| 2010/0237838 | A1* | 9/2010 | Templeton ............ H02M 3/157 323/271 |
| 2011/0181351 | A1 | 7/2011 | Young et al. |
| 2013/0263013 | A1* | 10/2013 | Jiang ................... G06F 3/04883 715/752 |

OTHER PUBLICATIONS

U.S. Appl. No. 13/878,965, filed May 6, 2013, Final Office Action, dated Jun. 19, 2017.
U.S. Appl. No. 13/878,965, filed May 6, 2013, Notice of Allowance, dated Feb. 9, 2018.
U.S. Appl. No. 13/878,965, filed May 6, 2013, Office Action, dated Jan. 5, 2016.
U.S. Appl. No. 13/878,965, filed May 6, 2013, Office Action, dated Dec. 1, 2016.
Great Britain Claims in application No. GB1017395.3, dated Mar. 2011, 7 pages.
Great Britain Intellectual Property Office, "Examination Report" in application No. GB1017395.3, dated Mar. 7, 2011, 6 pages.
Current claims in application No. PCT/EP2011/066385, dated Apr. 2013, 4 pages.
Current Claims in application No. PCT/EP2011/066385, dated Aug. 2012, 4 pages.
European Patent Office, "Search Report", PCT/EP2011/066385, dated Apr. 16, 2013, 7 pages.
International Search Report, PCT Application No. PCT/EP2011/066365, dated Aug. 22, 2012. 10 pages.
Notification Concerning Transmittal of International Preliminary Report on Patentability, PCT Application No. PCT/EP2011/066365, dated Apr. 25, 2013, 7 pages.

* cited by examiner

CONFIGURATION METHOD FOR A POWER SUPPLY CONTROLLER AND A CONTROLLER EMPLOYING SAME

CROSS-REFERENCE TO RELATED APPLICATIONS

This application is a Continuation of prior U.S. patent application Ser. No. 13/878,965 entitled "Configuration Method For A Power Supply Controller And A Controller Employing Same", filed May 6, 2013, which is a U.S. National Stage Patent Application filed under 35 U.S.C. § 371 of International Patent Appln. No. PCT/EP2011/066365 filed Sep. 20, 2011, which claims priority to British Patent Appln. No. 1017395.3 filed Oct. 14, 2010, and U.S. Provisional Patent Appln. No. 61/393,315 filed Oct. 14, 2010, the entire contents of all of which are hereby incorporated by reference as if fully set forth herein for all purposes.

RELATED APPLICATIONS

The present application is related to and claims the benefit of priority to each of U.S. Provisional Application No. 61/393,315 filed 14 Oct. 2010 and GB Patent Application No. 1017395.3 filed 14 Oct. 2010, the entire contents of each of which are hereby incorporated by reference.

FIELD OF APPLICATION

The present application relates to controllers for power supplies, for example controllers for switch mode power converters.

PRIOR ART

Power supplies, including for example power converters, are used to provide power to a load. Power converters of which DC-DC converters are an example are employed to convert an input DC voltage to another DC voltage. DC-DC converters may be classified generally as linear or switching. A conventional arrangement for a switching DC-DC converter 1 as shown in FIG. 1 uses a power stage 3 comprising one or more switching devices and one or more inductors or capacitors or both to convert an input voltage ($V_{in}$) to an output voltage ($V_{out}$). A controller 5 is employed to try and maintain the output voltage at a desired set point. Conventionally, pulse width modulation is employed to control the operation of the switching devices within the power stage and accordingly the controller provides a control signal to a PWM module which operates the switching devices. A variety of different switching circuit topologies may be employed within the power stage which will be familiar to those skilled in the art, including for example the conventional buck and boost topologies. In a linear switching supply, the gain of a transistor(s) or similar device is adjusted to achieve a desired output from an input voltage.

The output ($V_{out}$) from the DC-DC converter is typically provided to a load (not shown) which may be an electronic circuit comprising a plurality of components or just a single component, for example an LED light. Power controllers are used to control the operation of the power conversion (switching) circuit to ensure a desired output (e.g. voltage) is provided to the load. Whilst the controllers may be implemented using a discrete circuit, it is more common, for example in point of load controllers which are designed to be used on-board close to the actual load being supplied, for the controller to be provided in an integrated circuit.

To facilitate circuit designers and to ensure that one controller may be employed in a variety of different configurations, at least some of the operating parameters of controllers are generally configured to be set by a circuit designer.

Facilitating configurable operating parameters of controllers allows a circuit designer to select desirable behaviour in a particular power conversion application. Operating parameters include, for example, but are not limited to, switching frequency
maximum duty cycle
over-current protection (OCP) threshold
over-temperature protection (OTP) threshold
input voltage under-voltage lockout (UVLO) threshold
device address for communication purposes, and
loop control coefficients.

The setting of individual parameters may be performed by programming the controller. This programming may for example, be achieved through serial data transmission in which the parameters are sent to the controller and stored in memory. This function may be performed initially during a customisation stage performed at the time of circuit or controller manufacture. This approach is typically not available to an end user but instead is programmed in advance by the controller manufacturer.

An alternative and more common approach to configuring operating parameters is pin-programming. In pin-programming, the setting of an operating parameter is performed using a component connected to an associated configuration inputs (pin on the integrated circuit) of the converter. Using this approach, a circuit designer can set the parameters of a controller within a circuit by appropriate selection of components connected to the configuration inputs. The present application is directed to pin-programming.

In pin-programming, a measurement is made of an external component connected to the pin. For convenience, this measurement is typically one of resistance with the external component being a resistor. Although, other components and thus measurements may also be employed including, for example, capacitance are possible.

An example of a known controller configuration scenario using resistor programming for five different configurations is shown in FIG. 1. The left-hand side of the controller shows five configuration inputs (VSET—Output voltage set-point, ADDR—Communication address which might be a I2C or SMBus address the device will respond to when queried by a communication master, FSW—Switching frequency, CLM—Output current limit, UVLO—Input Under-Voltage LockoutEach) with each input being an associated pin on the controller.

Each configuration pin is connected to one end of an external programming resistor ($R_{VSET}$, $R_{ADDR}$, $R_{FSW}$, $R_{CLM}$, $R_{UVLO}$) with the opposite end of the resistor tied to a known voltage reference typically ground. The value of the external resistor is used to set (program) the configuration value associated with the pin. In operation, current sources within the controller are configured to inject a known current into each of the configuration resistors. From this injected current, a determination of the resistance of the external programming resistor is possible by measuring the voltage at the configuration inputs (pin). The voltage measurements are typically performed by one or more Analog to Digital Converters within the controller. Once a measurement has been obtained for each of the configuration resistors, the operating parameter assignments are made by the controller based on the measurement of the individual resistors. In this particular example, only five operating parameters are assigned (output voltage set-point, device address, switching frequency, current limit threshold, under-voltage-lockout threshold). In practise, there may be many more configuration pins.

Where no resistor is present, the controller typically defaults to a particular value, generally the maximum or minimum of the available range.

In this exemplary configuration, other operating parameters remain at their default values which will have been pre-defined by the controller manufacturer. Once the operating parameters are set, typically during start-up, the controller enters its normal operating mode in which the controller operates to deliver power to a load. More particularly, the controller provides switching signals to one or more switches in a power stage. The switches of the power stage in combination with energy storage devices such as inductors and capacitors operate to convert an input voltage to an output voltage. The controller receives a measurement of output voltage and operates to maintain this at a desired level set by one of the configuration pins.

Techniques are known in which a single pin on a controller may be used to set more than one operating parameter. Typically such techniques rely upon using two or more measurements at a pin. For example, in one arrangement, the polarity of the voltage at a pin is used as one measurement and the absolute value of voltage used as a second measurement, with the polarity determining the value of one operating parameter and the absolute voltage another operating parameter. Similarly, in place of using a single resistor to program, a capacitor resistor combination might be used. In this arrangement, a measurement of the resistance of the resistor and the capacitance of the capacitor may be employed as two separate measurements to set two respective operating parameters. Similarly, it is known to sense for more than one operating condition, e.g. fault detection, at a single pin.

Whilst these techniques can reduce the pin count on the integrated circuit of a controller, a typical controller may have between 50 to 100 different operating parameters which may be altered to achieve a desired operating configuration or performance. Typically, a significant number of these would be preset by the controller designer when designing the controller. However, circuit designers are desirable to having access to more of these parameters to optimise the performance or configure the controller's operation as a component within their circuits.

Whilst providing greater access to parameters allows circuit designers greater flexibility, there is a downside. The cost of converters increase with each configuration input added (due to increased silicon area as I/O pads are added, increased bonding cost, increased cost of silicon package, etc). The cost for the circuit designer also increases as one programming resistor is added to the build of materials (BOM) for each configuration input. As components are added to the BOM, system reliability is reduced (as expressed in Mean Time Between Failure (MTBF)).

SUMMARY

The present application provides for the setting of a plurality of different values using a single component. Thus reducing the number of I\O pads and parts required.

In a first arrangement, a method of configuring a controller for a power supply is provided. The controller is an integrated circuit having a plurality of pins, The controller has a plurality of settings configurable by a user. The method comprises performing a measurement at a pin and using said measurement to determine two or more of the settings. The using of said measurement may comprise the steps of deriving a pointer from the measurement and using the pointer to retrieve a reference table having at least one setting. The method may comprise the step of programming at least one setting in the reference table, for example during the manufacture of the integrated circuit.

The reference table may be within a programmable memory. The reference table may be programmable through a communications port, for example a serial port, on the controller.

In a second arrangement, a controller for a power converter is provided. In this second arrangement, the power converter is of the type having one or more power switches operable in response to switching signals from the controller. The controller is provided in an integrated circuit and comprises at least one programming pin to which an external programming component may be connected. A measurement circuit performs a measurement of the at least one external programming component. The controller is configured to determine two or more of the settings for the controller from said programming pin. The controller may comprise a memory for storing a plurality of configuration tables, with each configuration table storing a plurality of different parameter settings. The measurement circuit suitably comprises an analog to digital converter. The controller may employ the measurement to derive a pointer and uses the pointer to retrieve a configuration table from a memory. In turn this pointer may be obtained from a pointer reference table, which may be stored in memory, using the measurement or a derivation of the measurement as an input. The memory may be programmable, optionally during manufacture of the integrated circuit. Data for programming in the memory may be received through a communications port on the controller. At least one of the settings may be a set point for output voltage.

Thus, the present application provides a solution by which pin programming of one pin in a converter may be employed for the setting of more than one configuration setting.

The present application reduces to a minimum the required number of configuration inputs, and external configuration components and/or allows for more comprehensive POLC configuration. This is achieved through the method of configuration tables, and mapping of configuration inputs/components in order to select one of these configuration tables. A configuration table is a list of assignments of values to POLC operating parameters. A configuration table may be fixed or programmable, and may be of arbitrary length (i.e. a configuration table may contain an arbitrary number of assignments of values to operating parameters).

DESCRIPTION OF DRAWINGS

The present application will now be described with reference to the following drawings in which.

DETAILED DESCRIPTION

Figure 1:
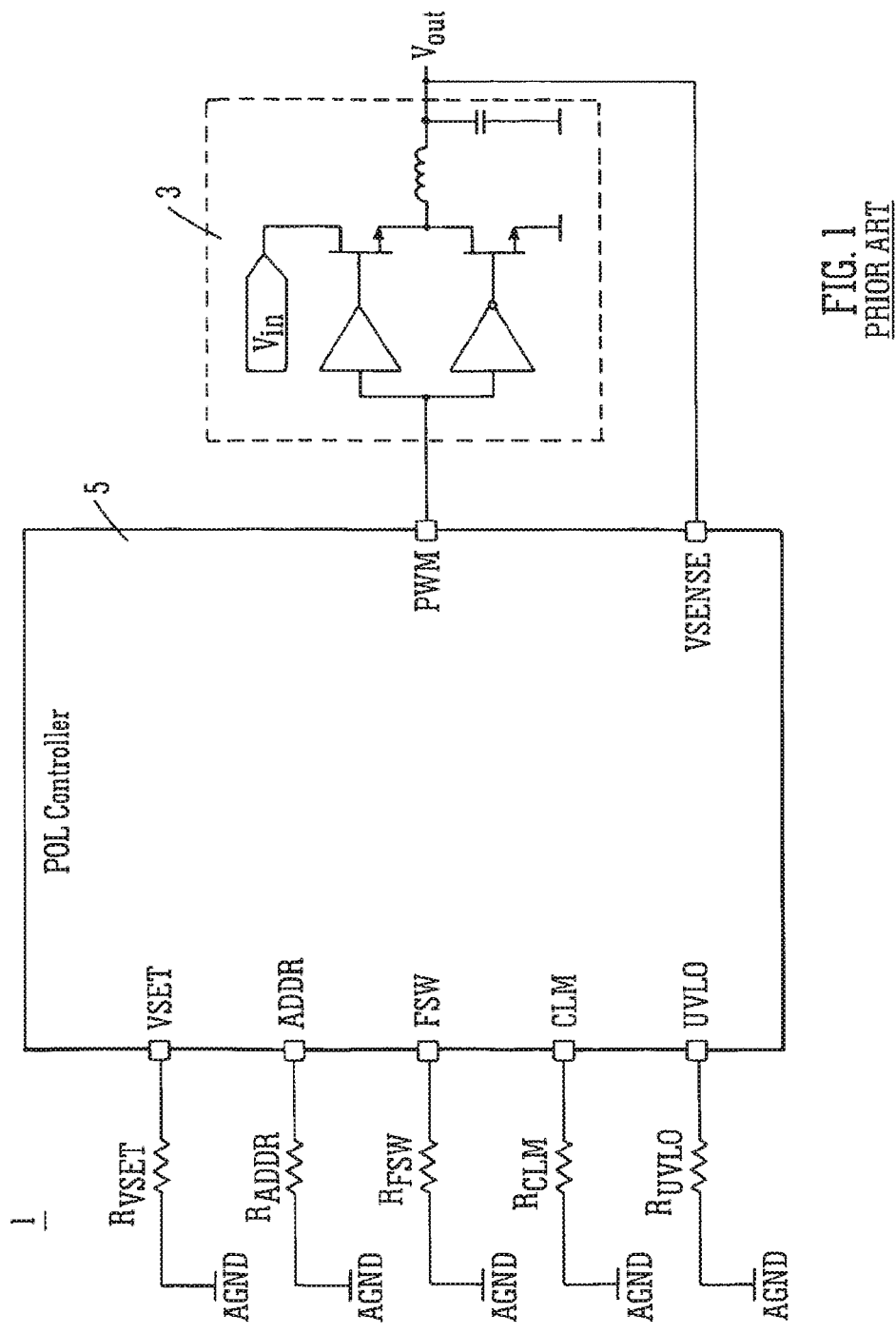
FIG. 1 is a simplified representation of a prior art power converter with pin programming providing for the programming of 5 different settings in a controller using five separate resistors.
Figure 2:
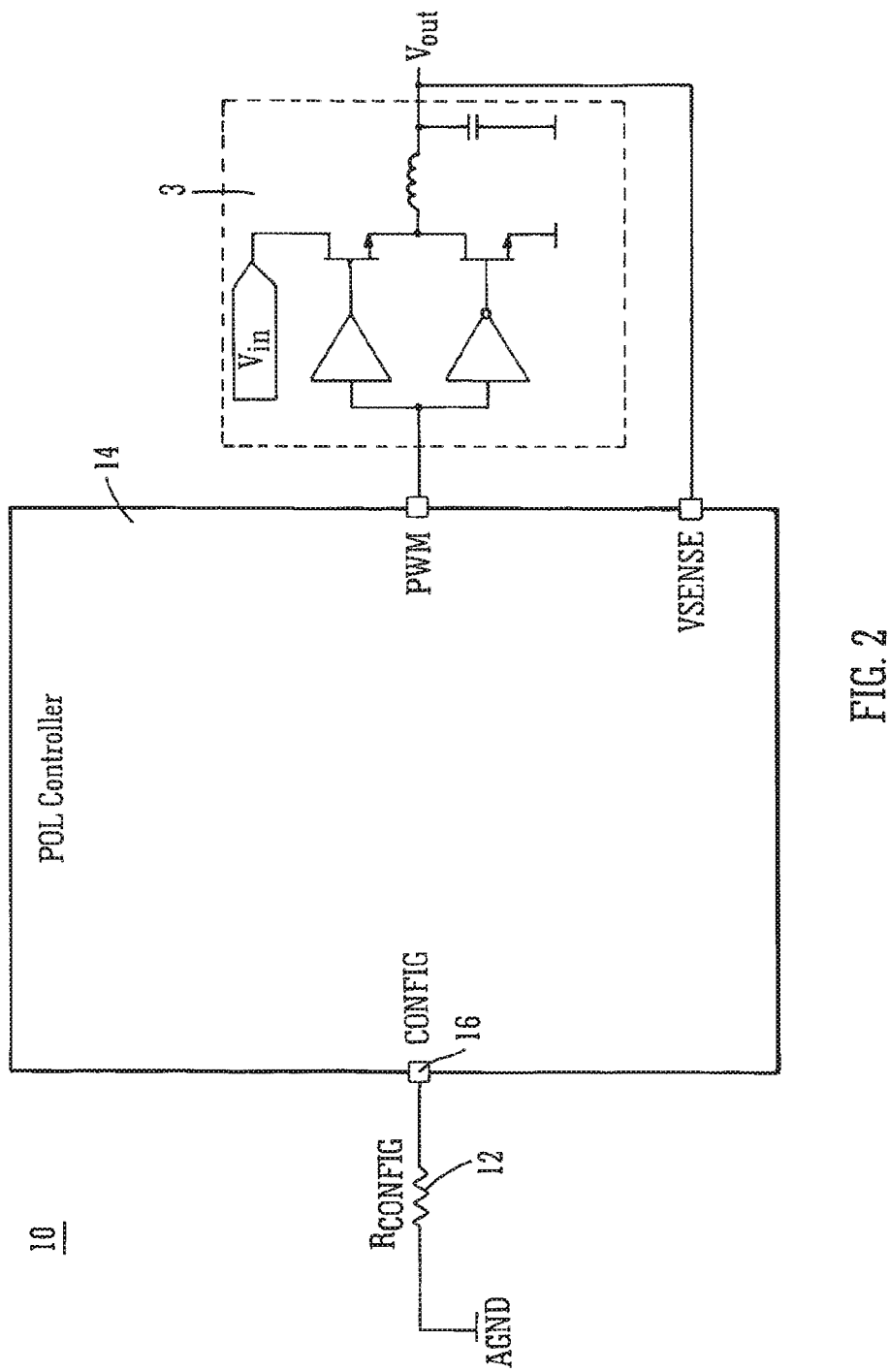
FIG. 2 is a representation of an exemplary implementation of the present application allowing for the configuration of the same 5 different settings of FIG. 1 with a single resistor.

The present application will now be described with reference to an exemplary implementation of a controller, as shown in FIG. 2, providing for the setting of the five parameters of FIG. 1 using just a single programming resistor and programming pin.

As with the prior art, a measurement is made at a programming pin 16. A pin programming feature is provided to determine the value of the programming resistor. For example, a current source internal to the controller may be provided providing a current to the pin and in which case the measurement at the pin is suitably one of voltage, which in turn is a measure of the resistance of the configuration resistor. This resistance measurement is employed to retrieve a setting for each of the different configuration parameters.

Figure 3:
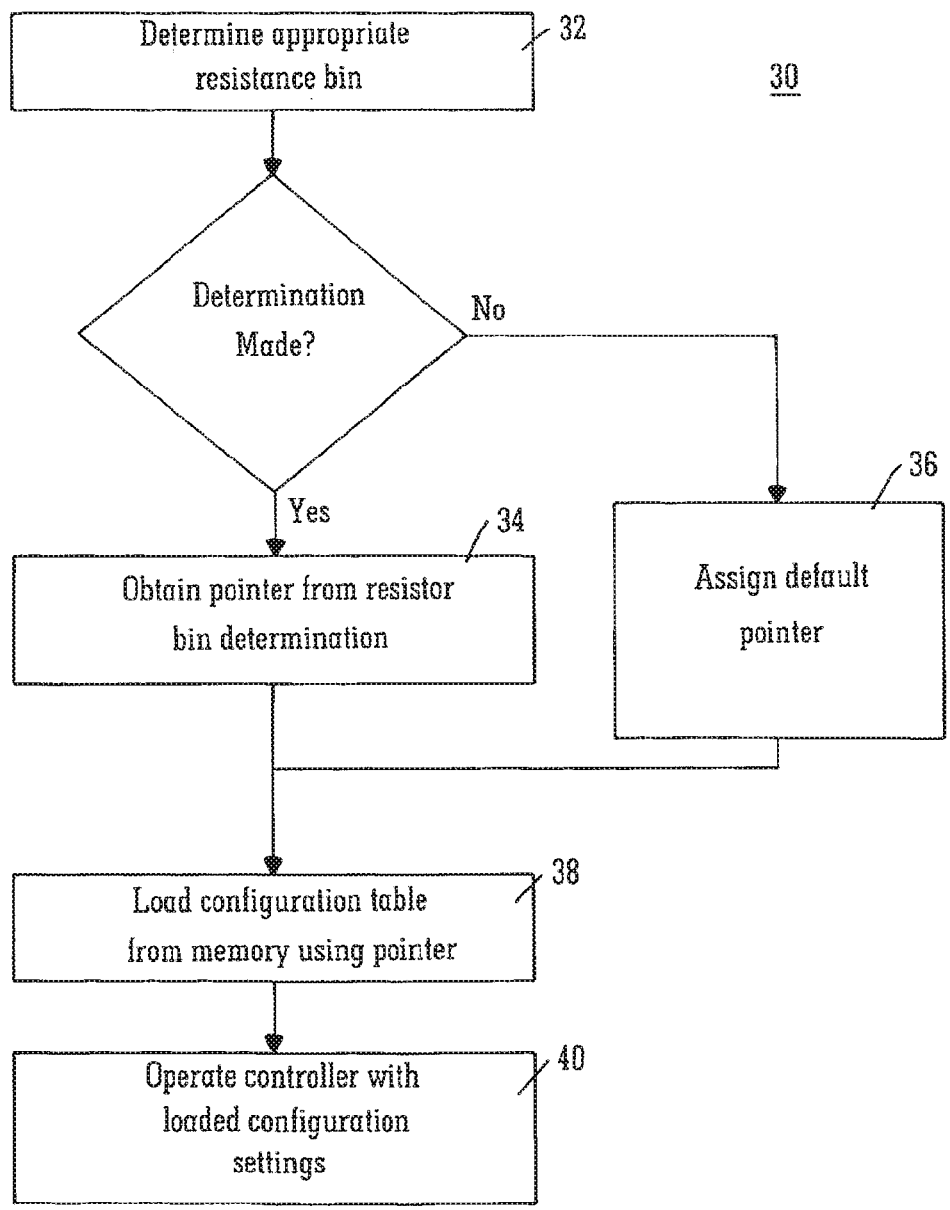
FIG. 3 is an exemplary flow chart of a method for use in the arrangement of FIG. 2.

More specifically, once a measurement of voltage has been taken, the controller, using for example the method of FIG. 3, determines the configuration settings to use for the particular programming value of resistor. Whilst in the exemplary circuit shown, five different parameters are set by the one resistor, in practise it may be as low as two or up to and including all of the available parameters in a particular controller. Preferably three or more parameters are set by the value of one resistor.

To account for variations in resistor resistance values from their nominal values, a margin of error may be employed in determining what the programming value (resistor) connected to the pin is. This margin of error may comprise dividing the voltages into ranges (bins) and determining the programming value from the range into which the measured voltage falls. Once a programming value has been determined 32 to be within a range (bin), a configuration table pointer for that range may be derived 34. This derivation may be inherent. For example, a pointer value of 1 may correspond to the first voltage range, with a pointer value of 2 to the second range and so on. Alternatively, a look-up table or other method may be employed to obtain the pointer from the determined range. The reason for this is simple and would be well understood by those with even a basic knowledge of electronics. Specifically, that resistors are available in standard values but these resistance values are the nominal ones and the actual value may vary in a range determined by the resistor tolerance. Thus in looking at a measurement of resistance, the controller is seeking to determine not necessarily the precise value of resistance attached but instead to distinguish between one standard resistance value and another. Thus if the controller was configured to be programmed by one of a 1 k, 2.2 k, 3.3 k, 4.7 k or 5.6 k resistor, the number of different resistor bins\ranges would be five with each range corresponding to one of the standard resistance values. Thus a pointer value of "1" might be assigned to any resistance between 0 and 1.6 k, with a pointer value of "2" being assigned to values between 1.6 k and 2.7 k and so on.

Alternatively stated, a continuous value range of $R_{CONFIG}$ is suitably segmented (sub-divided) into distinct resistance bins, with each bin allocated to a particular pointer value.

The number of distinct resistance bins, and thus pointer values, which can be reliably detected and distinguished depends on limitations of the circuit blocks involved (ADC accuracy and resolution, bias current accuracy, resistor accuracy etc). However, if the number of $R_{CONFIG}$ bins is not sufficiently high, a second configuration input, with a second $R_{CONFIG}$ may be employed. It will be appreciated that this increases the possible number of different bins values significantly since the inclusion of an extra programming pin squares the number of bin values compared to a single pin with the inclusion of a third pin, the number of bin values is increased by the power of three.

If the value of measured voltage falls outside all of the ranges, the controller may set 36 the pointer value to a default value. Similarly, if no pointer is allocated to a range a default pointer may be assigned.

The controller may then employ the pointer value to retrieve 38 a configuration table from memory. For each pointer there may be a corresponding configuration table. Each configuration table stores a separate parameter value for each of the settings. Exemplary variable values for a configuration table are shown below corresponding to those variables determined by the five separate resistors shown in FIG. 1:

| Vset | Output voltage set-point |
|---|---|
| Addr | Communication address, for example an I2C or SMBus address, which the device will respond to. |
| FSW | Switching frequency |
| CLM | Output current limit |
| UVLO | Input Under-Voltage Lockout |

It will be appreciated that rather than allowing a circuit designer to chose different parameter values, this method allows the circuit designer to chose different configurations of parameter values.

Other exemplary parameters that may be set within a configuration using this method would include but are not limited to one or more of the following:

VOUT_MAX: Maximum output voltage set-point which can be commanded

VOUT_MARGIN_HIGH: Output voltage set-point for margin high test

VOUT_MARGIN_LOW: Output voltage set-point for margin low test

VOUT_OVP: Output voltage Over-voltage protection trip-point

VOUT_OFFSET: Output voltage offset correction parameter

VOUT_ON_RISE_TIME: Output voltage rise time

VOUT_ON_DELAY: Output voltage ramp delay following an ON command

VOUT_OFF_DELAY: Output voltage ramp delay following an ON command

VIN_UVLO_RESPONSE: Programmable response to UVLO condition (immediate shutdown, delayed shutdown)

VIN_OVLO_THRESOLD: Input voltage over-voltage protection threshold

VIN_OVLO_RESPONSE: Programmable response to OVLO condition (immediate shutdown, delayed shutdown)

IOUT_OCP_RESPONSE: Programmable response to OCP condition (immediate shutdown, delayed shutdown)

IOUT_LCP_PROTECTION: Output current lethal protection (ultra-fast but coarse threshold, amends OCP)

IOUT_PHASE_DROP_ENABLE: Phase drop feature (on/off)

IOUT_PHASE_DROP_THRESHOLD: Output current phase drop threshold
OTP_THRESHOLD: Over-temperature protection threshold
OTP: RESPONSE Programmable response to OTP condition (immediate shutdown, delayed shutdown)
OPERATION_RESPONSE: Programmable response to OPERATION command (ignore, accept)
CTRL_RESPONSE: Programmable response to CTRL pin (ignore, accept)
CTRL_POLARITY: Programmable polarity of CTRL pin (active high, active low)
DUTY_CYCLE_MIN: Minimum duty cycle
DUTY_CYCLE_MAX: Maximum duty cycle
MOSFET_DRIVER_TYPE: Tristable, diode emulation, etc.
MULTI_STRESS_SHARE: Multi-POL stress share feature (on/off)
MULTI_SYNC: Multi-POL synchronisation feature (on/off), and
MULTI_SYNC_PHASE_SHIFT: Multi-POL synchronisation phase shift.

The configuration tables may be pre-programmed by the controller designer and hardwired into the controller design. Alternatively, the configuration tables may be programmable. The programming of the configuration tables may be performed during manufacture or in a subsequent customisation step. For example, the controller may be provided with a communications port, for example a serial port. By placing the controller in a set-up mode, the controller may be configured to allow the programming of the configuration tables in memory using data received from the serial port.

Figure 4:
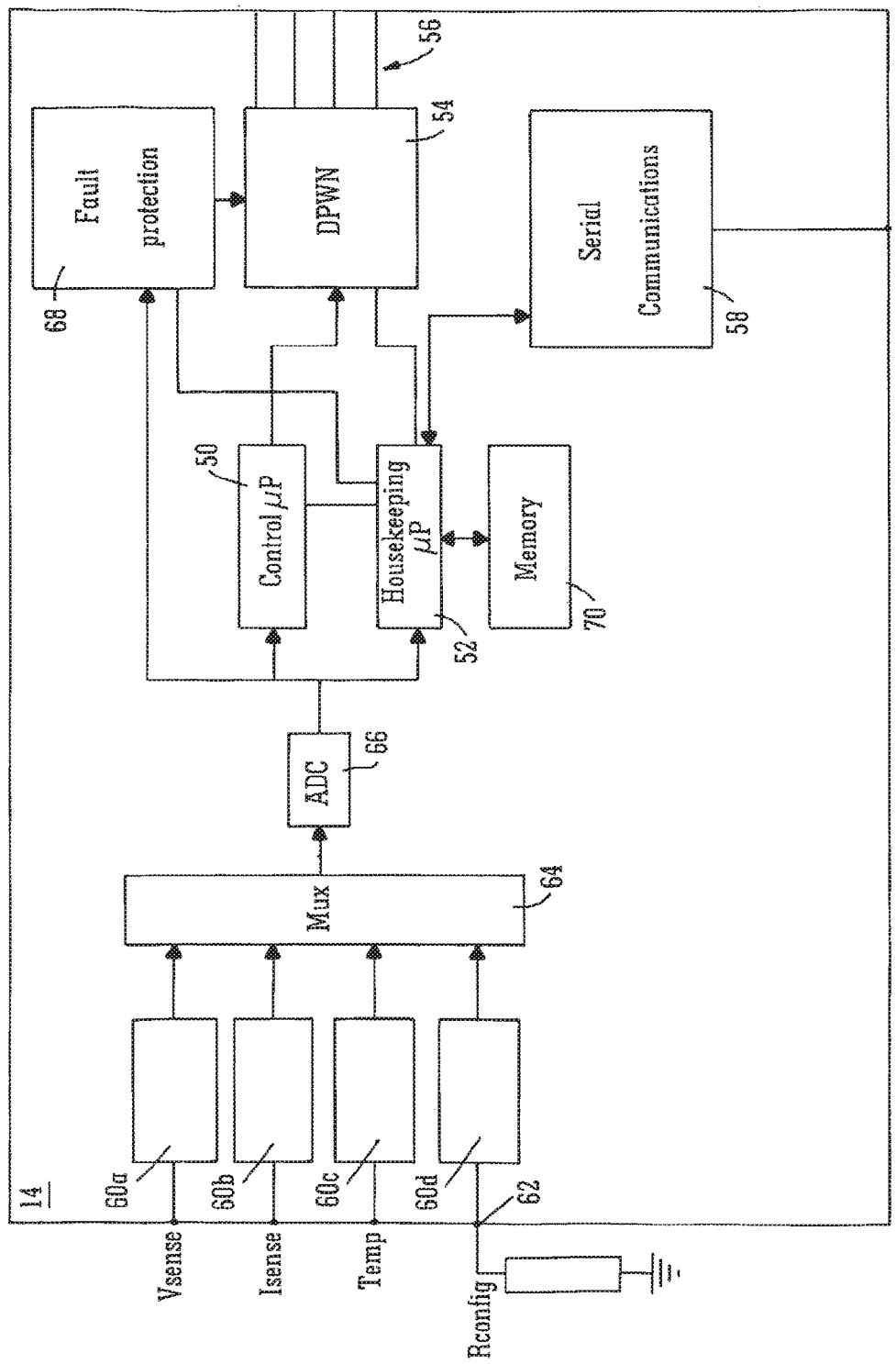
FIG. 4 is a block diagram of an exemplary POL power converter for use in the arrangement of FIG. 2.

A more detailed implementation of an exemplary controller will now be explained with reference to FIG. 4. In brief, the controller 14 which is suitably fabricated on a single integrated circuit comprises two processors 50, 52 responsible for the operation of the controller. The first processor 50 is responsible for the direct control of the desired voltage\current being delivered by the converter to a load. The first processor may be purposely designed for this task and is generally selected to be able to respond quickly to changing loads etc. The first processor acts upon external measurements received, including for example sensed output voltage, current and temperature. The first processor using control algorithms and parameter settings (as previously described) including for example voltage set point provides one or more control signals to a digital pulse width modulator 54. The digital pulse width modulator in turn generates a plurality of switching signals 56 to drive the converter. These switching signals are provided through pins of the integrated circuit to power switches in a power stage being controlled by the controller. The power stage may be configured in any of several different topologies including for example, buck and boost. The power stage in turn through the switching of the power switches converts an input supply voltage to another voltage and provides this to a local load. The input voltage may be greater than or less than the voltage supplied to the load and may have the same or different polarity depending on the arrangement of the power stage and the configuration settings of the controller.

The second processor 52 provided within the controller is for housekeeping purposes. The use of the second processor ensures that the primary processor is not distracted from its primary purpose of controlling the power stage through the DPWM. The second processor may for example facilitate communications, for example through a communications circuit 58 over a serial communications bus, with external devices. It will be appreciated that a controller may be provided with just a single processor combining the functions of both processors or indeed their roles may be further broken down with more than two processors present.

One or more analog inputs ($V_{sense}$, $I_{sense}$, Temp, and $R_{config}$) are provided to the controller at designated pins. These analog inputs may include signals being measured including for example Vout, Iout and temperature. The analog inputs also include one or more configuration pins 62.

Each of the analog input pins may have an associated signal conditioning circuit (60a-d). Thus where the pin is "programmed" by a resistor, a known current may be generated by the associated signal conditioning circuit (60d) in the controller and injected at the pin 62. Other pins may have signal conditioning circuits that include scaling and filtering. Each analog input may be connected via a multiplexor 64 to an analog to digital converter 66. The multiplexor is configured to switch the input to the ADC in response to instructions from one or either or both of the processors. Thus for example, the second processor may employ the multiplexor and ADC to obtain particular settings on start-up, e.g. from a measurement of the resistance at a programming pin with the first processor employing the multiplexor and ADC for in-circuit measurements during normal operation. It will be appreciated that the use of the multiplexor obviates the need for multiple ADC circuits.

Whilst it will be appreciated that the use of a multiplexor with a single ADC offers a considerable saving in space and power within an integrated circuit, the resolution of the ADC is determined with respect to the input requiring the greatest possible resolution, thus for certain inputs including pin programming, the full resolution, for example 12 bits, of the output from the ADC may not be required. Accordingly, depending on the input signal the digital output from the ADC may be truncated (with or without rounding) to a lower resolution digital signal. The measurements from the ADC are available to other components within the integrated circuit over a suitable internal bus or other arrangement. Thus a voltage measurement may be provided to multiple circuits within the integrated circuit. For example, a fault protection circuit 68 may be included which limits the operation of the DPWM in response to a detected fault condition, e.g. an over-voltage.

Figure 5:
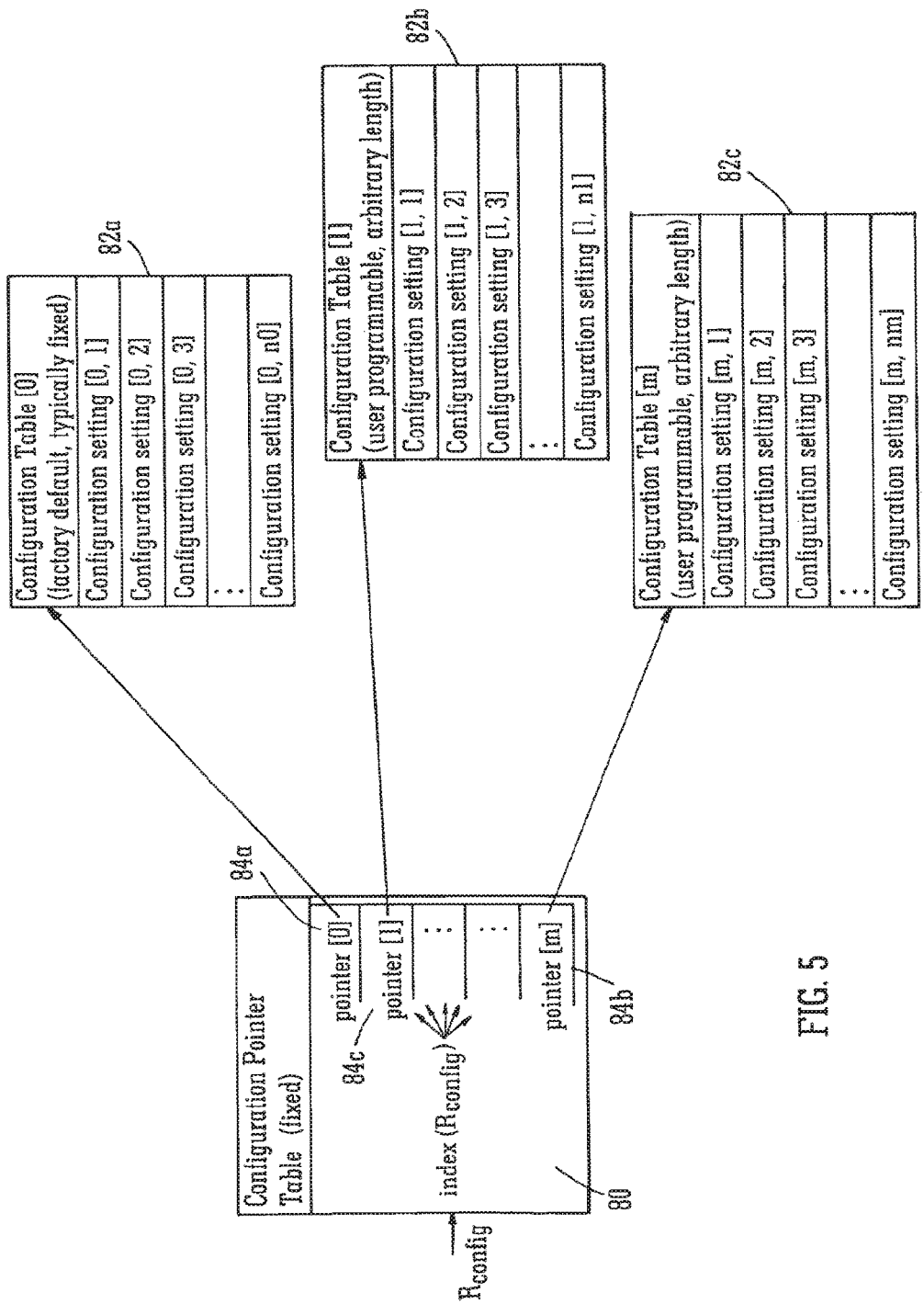
FIG. 5 is illustrates an exemplary arrangement of tables which may be employed in the arrangement of FIG. 2.

During start-up, periodically or in response to an external trigger, a measurement is made at a programming pin of a programming resistor to obtain a programming value. This voltage measurement is provided from the ADC to the second processor 52 which is responsible for the housekeeping functions of the controller. This second processor in turn determines an appropriate configuration from the measurement for example by using the determined resistor value as input to a configuration pointer table 80, as shown in FIG. 5, to determine a pointer from the measurement. The determined pointer may then be used to retrieve a configuration table 82a-c from memory 70. The configuration settings may then be provided to and employed by the first processor 50 or indeed other circuits (e.g. DPWM 54 or fault protection 68) within the controller to operate the controller in a desired manner. In contrast to the prior art, the present application allows for the configuration of multiple parameters using one component connected to a single programming pin.

To determine the appropriate configuration, the second processor directs the multiplexor to connect the appropriate configuration pin to the ADC. A measurement of the voltage (and hence resistance of the programming resistor) at the pin is then provided by the ADC to the second processor.

The second processor in turn determines a configuration pointer from the resistance measurement. This determination may be made with reference to a reference table or algorithm. Thus for example as previously described a resistor bin value may be employed as input to a pointer reference table from which a pointer is obtained in response.

Where more than two programming pins are employed together, the second processor may use the two resistor bin values together as inputs to the pointer reference table to determine an appropriate pointer. The pointer reference table may be inherent as explained before or it may be stored in memory. An advantage of storing the reference table in memory is that it may be programmed by a user. Thus where there are only, for example 5 configuration tables provided but 12 different possible resistor bins, then the pointers for the non-required resistor bins may be programmed to be a default pointer which in turn points to a default configuration table.

The determined pointer value is then used by the second processor to retrieve a corresponding configuration table from memory. For each distinct pointer value 84a-c, there is a corresponding configuration table 82a-c. Each configuration table stores values for a plurality of different parameters. The values stored in each configuration table are pre-programmed into the controller during a manufacturing or subsequent customisation stage. It will be appreciated that the number of different combinations is limited by the number of different configuration tables stored which in turn is limited by the maximum pointer value available. However in reality, only a limited number of different configuration tables may be required. In such a scenario, unused pointers in the pointer table may be directed to point to a default configuration table.

A converter may be shipped with an arbitrary number of configuration tables stored in the device. Configuration tables may be stored in suitable types of memory (e.g. ROM, or NVM). If programmable, configuration tables may be programmed into the device by either the controller manufacturer, an out-source partner specialising in IC programming, or the power circuit manufacturer at a pre-assembly manufacturing stage.

The configuration settings in a configuration table may either be defined by the controller manufacturer, or specified by a circuit designer using the controller in order to serve a particular need in a circuit. A user of a controller may order from the controller manufacturer a controller part with a plurality of, for example 100, different configuration tables, allowing the user to use the controller in a correspondingly large number of different power conversion applications, while retaining the freedom to select one configuration table for a particular application using one or more configuration inputs in combination with associated configuration resistors. The advantage of this approach is that the controller user need to hold only one variety of controller in stock (simplified material management, reduced cost) while selection of one particular configuration table is straight-forward by means of a resistor which is both robust and flexible. In contrast to prior art, a much reduced number of external components is required, plus an arbitrary number of configuration settings may be achieved as configuration tables may contain a large number of configuration settings. Thus for a device with 50 different parameter settings, the circuit designer may elect 10 different configurations to suit ten different converter circuits. The same controller may be used in each of the ten different converter circuits and the 50 different parameters will be set in each converter circuit by a single programming resistor.

Figure 6:
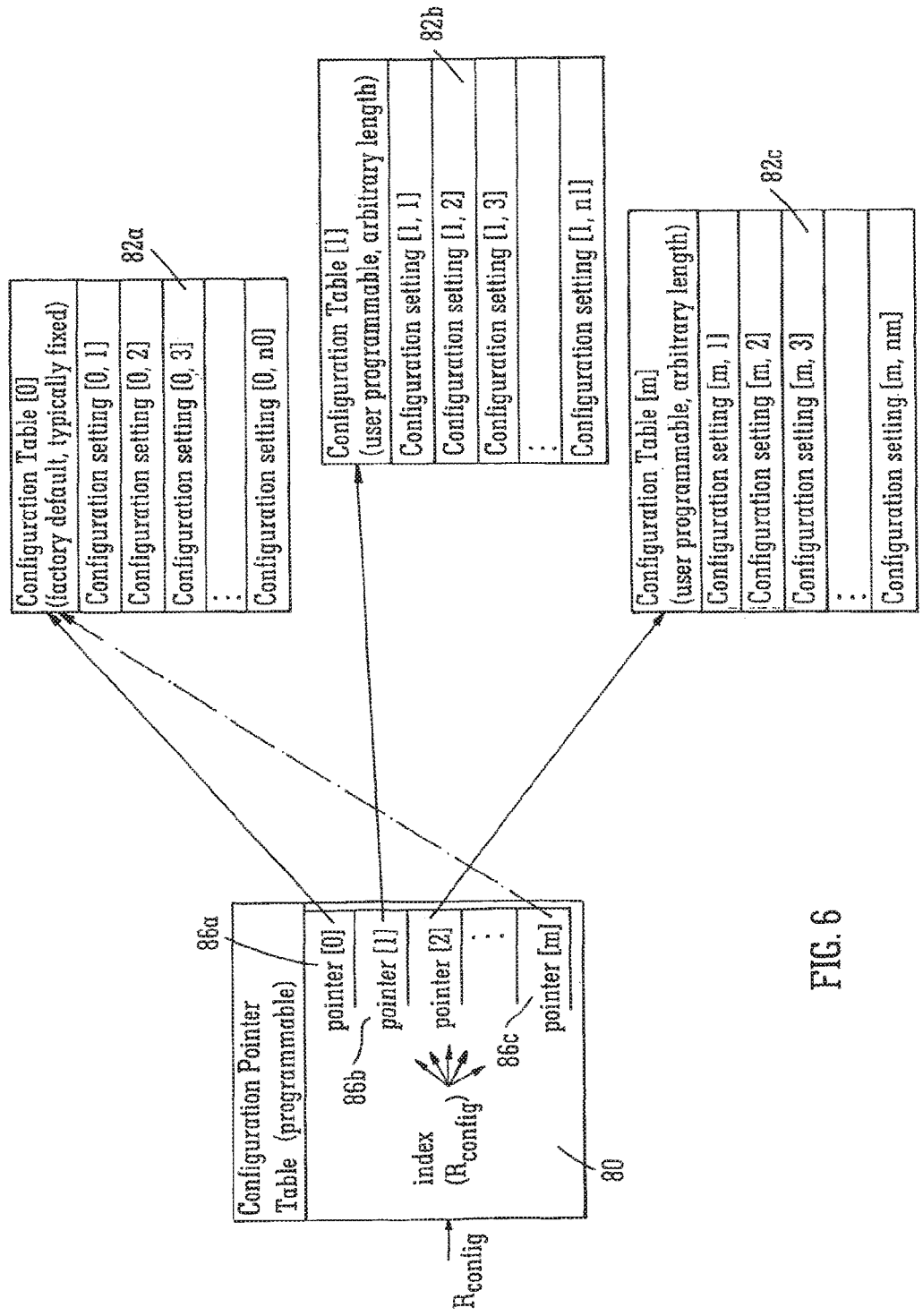
FIG. 6 is illustrates a further exemplary arrangement of tables which may be employed in the arrangement of FIG. 2.

Whilst the above explanation has been made with respect to configuration tables 82a-c being programmable, the configuration pointer table may also be configured to be programmable as shown in the arrangement of FIG. 6. In this arrangement, a controller may be manufactured and shipped with an arbitrary number of configuration tables 82a-c. The controller user can however customise the mapping to the configuration table by altering pointers values 86a-d within the pointer table 80. Thus a reduced number of configuration tables may be made available. In such an arrangement, the pointer reference table may be updated to set unwanted pointer values to a default value.

Whilst the above description has been made with reference to the use of reference tables it will be appreciated that other techniques are possible. Thus for example, the software code itself implemented by one or more processors may be altered to set different values for multiple parameters in response to differently determined resistance bin values. Although, it will be appreciated that this is a cumbersome approach. Alternatively, a combination of the two techniques may be employed. For example, a determination of one parameter may be made with respect to whether the attached programming resistor is greater than or less than a particular value with a further determination one or more other parameters made based on which resistance bin the programming resistor falls into as previously described.

Whilst the technique of the present application may be used with more than one programming pin, it will be appreciated that the number of different parameters which may be set are limited not by the number of pins but by the contents of the configuration tables. Generally however the number of parameters being set by programming resistors using the present method will be greater than the number of programming resistors used for this purpose.

It will be appreciated that the present technique may be combined with those from the prior art and thus one programming pin or set of pins may be employed using the techniques described above for setting a first set of parameter values with another programming pin or set of pins using the techniques of the prior art for setting one or more other parameter values.

For the purposes of explanation, the following is a list of abbreviations employed in the current specification.

Abbreviations

| | |
|---|---|
| ADC | Analogue-digital converter |
| BOM | Bill of material |
| IC | Integrated Circuit |
| MTBF | Mean time between failures (relating to random failure rates of electronic systems) |
| NVM | Non-volatile memory |
| OCP | Over-current protection (relating to output current Iout) |
| OTP | Over-temperature protection |
| OVP | Over-voltage protection (relating to output voltage Vout) |
| POL | Point of Load. A point of load converter is a non-isolated power converter, delivering regulated power to a load in close physical proximity. |
| POLC | POL Controller |
| RAM | Random-access memory |
| ROM | Read-only memory |
| UVLO | Under-voltage lockout (relating to input voltage Vin) |

It will be appreciated that whilst several different embodiments have been described herein, that the features of each may be advantageously combined together in a variety of forms to achieve advantage. Thus for example, whilst the above description has been made with reference to an exemplary controller as employed by the present assignee, it will be appreciated that the method may also be applied and\or incorporated within other adaptive control schemes. Similarly, whilst the above system and method has been described generally with respect to a switch mode power supply, it will be appreciated that the technique may also be applied to non-switching (linear) power supplies. It will be appreciated that in such an arrangement, the DPWM would be replaced with a linear driving stage and the power stage would be a linear mode power stage.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage. It will be appreciated that the claims of the present application have been written in single dependency form to meet the requirements of certain jurisdictions. Accordingly the claims should be taken as being multiply dependent unless the context excludes it and that all combinations resulting there from should be taken as being provided for.

The invention claimed is:

1. A DC-DC switching power converter controller for controlling a controller, the controller being packaged within an integrated circuit, the integrated circuit comprising a plurality of pins making external connections from the integrated circuit, the plurality of pins comprising:
   a voltage sense pin sensing the output voltage of the DC-DC switching power converter;
   a configuration pin and a first pulse width modulator (PWM) pin;
   the integrated circuit further comprising:
   an analog to digital converter converting the voltage sensed at the voltage sense pin to a digital sensed voltage;
   a first controller providing an output control signal in responsive to the digital sensed voltage;
   a first pulse width modulator responsive to the output control signal to provide a first PWM output signal at the first PWM pin;
   a non-volatile memory (NVM) storing at least four configuration tables, each configuration table in turn comprising values for at least four parameters employed by the first controller;
   a configuration pin connecting to a first end of a single configuration resistor, the second end of the configuration resistor being connectable to a ground voltage;

a measurement circuit making a measurement of the resistance of the single configuration resistor at the configuration pin;

a second controller using the resistance measurement of the single configuration resistor as a sole input to select a configuration table to be employed by the integrated circuit.

2. The DC-DC switching power converter controller of claim 1, wherein the integrated circuit further comprises at least one serial communications pin for communicating serially with other devices.

3. The DC-DC switching power converter controller of claim 2, wherein the configuration settings are set by data received serially by the integrated circuit at the serial communications pin.

4. The DC-DC switching power converter controller of claim 3, wherein the values in the configuration tables are preset with factory settings and updatable using data transmitted serially to the integrated circuit using the serial communications pin.

5. The DC-DC switching power converter controller of claim 1, wherein the value of the single configuration resistor is selected from a series of standard resistor values.

6. The DC-DC switching power converter controller of claim 5, wherein the series of standard resistor values includes at least the values of 2200 ohms, 3300 ohms, 4700 ohms and 5600 ohms.

7. The DC-DC switching power converter controller of claim 1, further comprising at least one temperature sense pin receiving a temperature measurement for DC-DC switching power converter.

8. The DC-DC switching power converter controller of claim 1, wherein one of the parameters is output voltage ramp delay from when the integrated circuit is enabled.

9. The DC-DC switching power converter controller of claim 1, wherein one of the parameters is an output voltage rise time from when the integrated circuit is enabled.

10. The DC-DC switching power converter controller of claim 1, wherein one of the parameters is an input voltage over-voltage protection threshold.

* * * * *